2 Sheets—Sheet 1.

W. H. JOLLIFFE.

Assignor to THE JOLLIFFE MANUFACTURING COMPANY.

COMBINED AWNING AND BLIND.

No. 10,798. Reissued Jan. 18, 1887.

Attest
Joshua Mallack Jr.
Frank J. Crowne

Inventor
William H. Jolliffe
by his attorney
G. J. Harding

2 Sheets—Sheet 2.

W. H. JOLLIFFE.

Assignor to THE JOLLIFFE MANUFACTURING COMPANY.

COMBINED AWNING AND BLIND.

No. 10,798. Reissued Jan. 18, 1887.

Attest
Joshua Wallack Jr.
Frank J. Browne

Inventor
William H. Jolliffe
by his attorney
G. J. Harding

UNITED STATES PATENT OFFICE.

WILLIAM H. JOLLIFFE, OF BALTIMORE, MARYLAND, ASSIGNOR TO THE JOLLIFFE MANUFACTURING COMPANY OF NEW JERSEY.

COMBINED AWNING AND BLIND.

SPECIFICATION forming part of Reissued Letters Patent No. 10,798, dated January 18, 1887.

Original No. 336,009, dated February 9, 1886. Application for reissue filed April 24, 1886. Serial No. 200,095.

*To all whom it may concern:*

Be it known that I, WILLIAM H. JOLLIFFE, a citizen of the United States, residing at Baltimore, in the State of Maryland, have invented certain new and useful Improvements in a Combined Awning and Blind, of which the following is a specification.

My invention relates to an improved combined window blind and awning.

The invention consists in certain features of construction and combinations of parts, hereinafter fully described.

The drawings herewith illustrate the invention.

Figure 1:
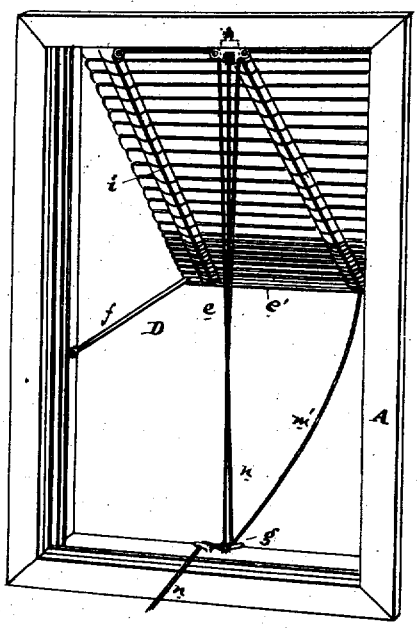
Figure 2:
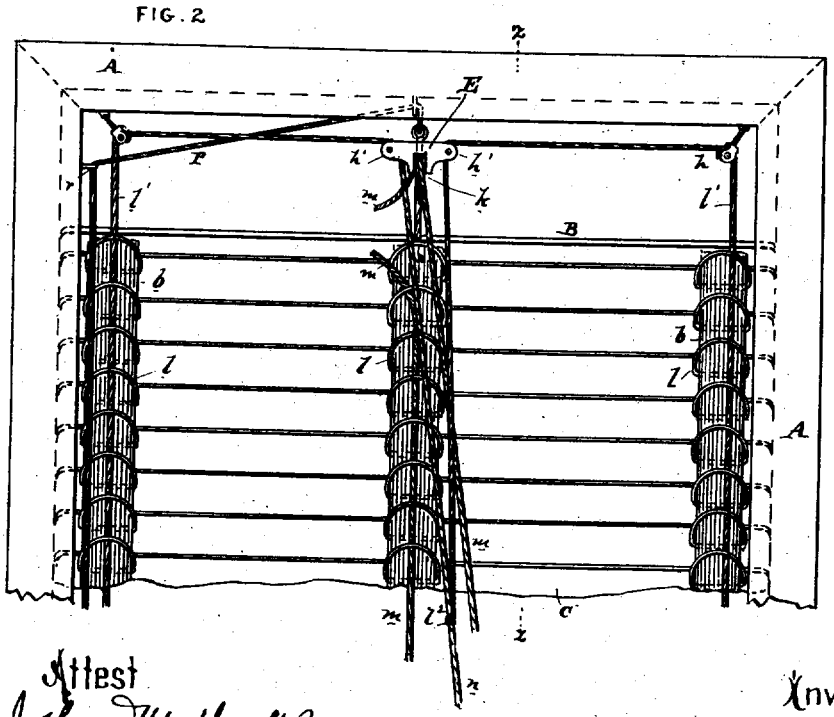
Figure 3:
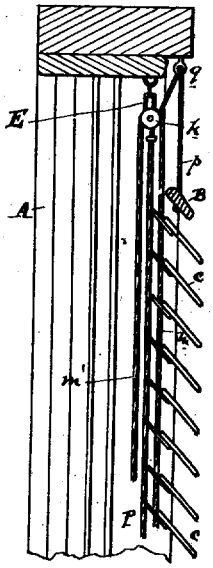
Figure 4:
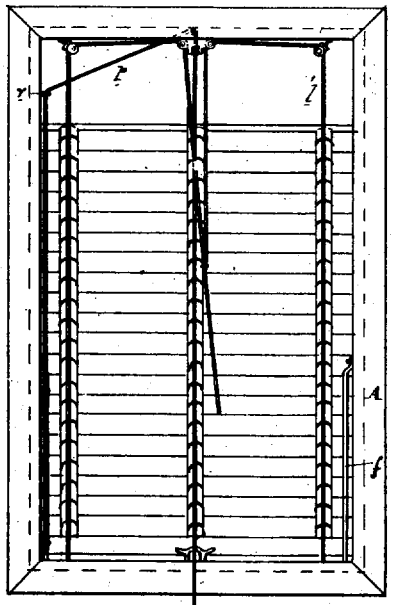
Figure 5:
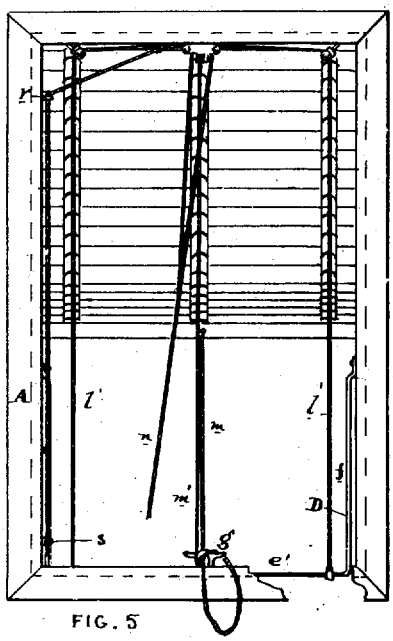
Figure 6:
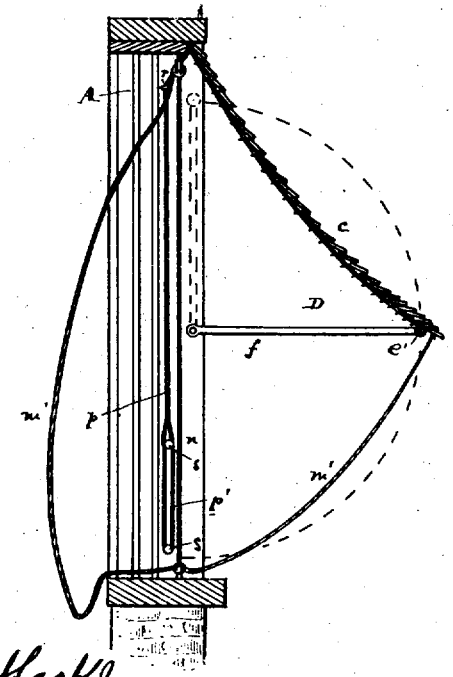
Figure 7:
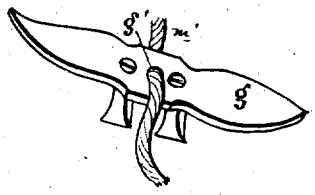

Figure 1 is a perspective view, from the inner side, of a window-frame, showing in a general way, the improved blind-awning applied thereto and raised to a position for service as an awning. Fig. 2 is a view from the inner side of the window, showing more in detail the hangings or tackle of the blind-awning. Fig. 3 is a vertical section taken on the line *z* of Fig. 2. Fig. 4 shows the blind-awning hanging as a blind and the top part lowered. Fig. 5 shows the blind-awning hanging as a blind and raised from the bottom. Fig. 6 is a vertical section of a window-frame and blind-awning, showing the latter raised to serve as an awning. Fig. 7 is a view of the make-fast or hitching device.

The letter A designates a window-frame. The blind-awning consists of slats made of wood or other material. These slats are joined to each other, but are not rigidly connected. I join these slats by connecting them together with flexible material or any other material which will not form a rigid connection, the tapes or cords being attached to the inside and at the outer ends, or outer ends and center, of the slats. The upper ends of the tapes or cords are made fast to the bar B, to which the slats are suspended, while the lower end is made fast to the lowermost slat. I do not confine myself to any particular number of tapes or cords, as in wide blinds I may use several rows of connecting cords or tapes. A metal rod, D, is bent to form two angles, *e*, and its two parallel ends, *f*, are each pivoted to an opposite vertical side of the window-frame. The cross-bar part *e'* of this rod is attached, as below explained, to the lower end of the hanging blind, and constitutes a stretcher when it is desired the device shall serve as an awning.

To the top of the window-frame, near each side, a pulley, *h*, is attached, and at the center, between them, is a block, E, with three pulleys, the two side ones *h'* of which turn in the same plane, while the middle one, *k*, turns in a plane at right angles therewith. To each slat *c* three rings, *l*, are attached, one at the center and one near each end. These rings thus arranged form three vertical rows on the inner surface of the blind, and by preference the said rings are attached on the same vertical line where the tapes are. A cord, *l'*, passes up through each of the two side rows of rings, and the lower end of each of said cords is attached (see Fig. 5) to the cross-bar *e'* of the stretcher-rod, and at the window-frame top each of said cords passes through one of the side pulleys *h* toward the center, and then through one of the pulleys *h'* on the center-block, and thence the two cords unite at a point, $l^2$, in one cord, *n*, which serves, when pulled, to swing the stretcher-rod on its pivots and put the slats in position to serve as an awning. (See Figs. 1 and 6.)

A make-fast, *g*, is secured to the middle of the window-sill, and by hitching the cord *n* thereto the awning will be held.

When the slats are hanging down to cover the window as a blind, the stretcher-rod D hangs down, as seen in Figs. 4 and 5.

A center cord, *m*, passes up through the center row of rings, its lower end being made fast to the lowermost slat, and at the window-frame top it passes through the middle pulley, *k*, on the center block, and thence down at *m'*. By drawing on this down end *m'* the lower portion of the blind may be raised from the bottom, in doing which the lower slats will be gathered together, and the rings *l* on said slats will slide up the side cords, *l'*, as shown in Fig. 5, and the blind will be retained in this position by hitching the said down end *m'* of the center cord to the make-fast *g* on the window-sill.

The down end *m'* of the center cord passes loosely through a hole, *g'*, in the make-fast, thence passes under the stretcher-bar $e'$, and is made fast to the lowermost slat. When the said stretcher is swung outward to the position of an awning, that part of the cord $m'$ between the make-fast $g$ and the cross-bar $e'$ serves to draw in the awning.

The ends of the stretcher-bar are pivoted to the window-frame sides at such a point or distance from the frame-top as will permit the cross-bar $e'$ to turn clear up and take position below the frame-top, as indicated by broken lines in Fig. 6, and also afford room below said frame-top for the gathered slats. By turning the stretcher-bar up to this position the slats will not obstruct the light entering the window.

The top cross-bar of the blind is suspended by a cord, $p$, whose end is made fast to the center of the said cross-bar. This cord passes up and through a metal eye or pulley, $q$, fixed at the top of the window-frame, (see Figs. 3 and 4,) and thence passes to one side of the window-frame, and through a metal eye or pulley, $r$, fixed thereto, and thence down alongside of the window-frame. The lower end of this cord has a loop, $p'$, which hooks over a suitable knob or pin, $s$, on the frame side, and thereby the blind is suspended. If it is desired to lower the top part of the blind, as shown in Fig. 4, for the purpose of admitting light at the top, the cord-loop $p'$ may be removed from the knob $s$, and then the top cross-bar, B, and blind may be lowered as much as desired and sustained by hitching the cord on the upper knob, $s$. By this arrangement the blind-awning may be swung out from the bottom by moving the stretcher-bar, and partially lowered from the top at the same time.

Having now described my invention, what I claim as new, and desire to secure by Letters Patent, is—

1. In a combined blind and awning, the combination of slats connected together by flexible material, each slat provided with rings and the whole suspended, a stretcher-bar having two parallel ends pivoted to the sides of the window-frame, side cords, $i$, attached to the cross-bars of the stretcher, passed up through the rings in the slots, through pulleys at the frame-top, and then down, for the purpose of converting said blind into an awning, and a center cord, $m$, having its end made fast to the lowermost slat, pressed up through the center ring and through a pulley at the top, and then down through a make-fast, said slats not being attached to the stretcher-bar.

2. In a combined blind and awning, the combination of slats connected together by flexible material, each slat provided with rings and the whole suspended, a stretcher-bar having two parallel ends pivoted to the sides of the window-frame, side cords, $l'$, passed up through the rings in the slats to form guides, and a center cord, $m$, having its end made fast to the lowermost slat, passed up through a center ring in the slats and under the stretcher-bar, and again attached to the lowermost slat for the purpose of raising or lowering the blind.

3. In a combined blind and awning, the combination of slats connected together by flexible material, each slat provided with rings and the whole suspended, a stretcher-bar having two parallel ends pivoted to the sides of the window-frame, side cords, $l'$, attached to the cross-bar of the stretcher, passed up through the rings on the slats, through pulleys at the frame-top, and then down, and a center cord, $m$, having its end made fast to the lowermost slat, passed up and through a pulley at the top, and then down, as set forth.

WILLIAM H. JOLLIFFE.

Witnesses:
JOHN FITZWATER,
HARRY S. CARSON.